E. A. SPERRY.
GYROSCOPIC NAVIGATION APPARATUS.
APPLICATION FILED JUNE 21, 1911.
1,255,480.
Patented Feb. 5, 1918.
4 SHEETS—SHEET 1.
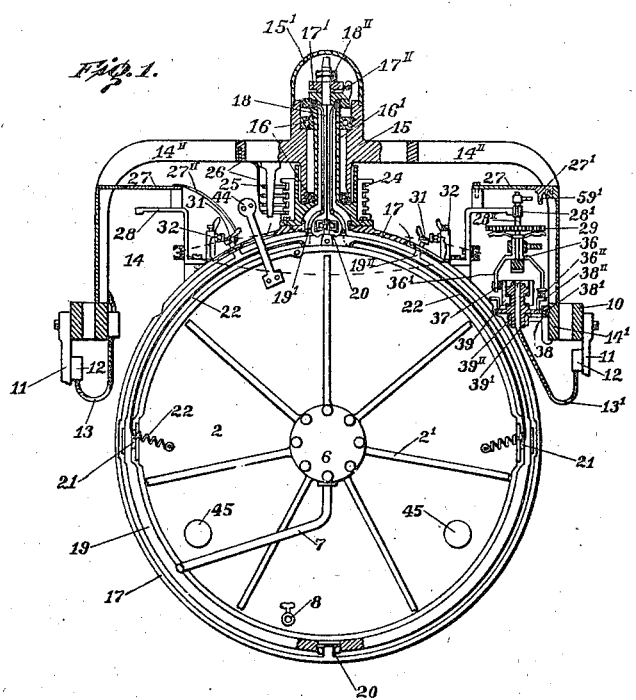
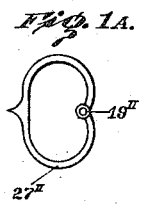
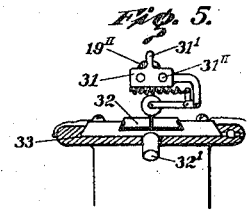
Witnesses
Inventor

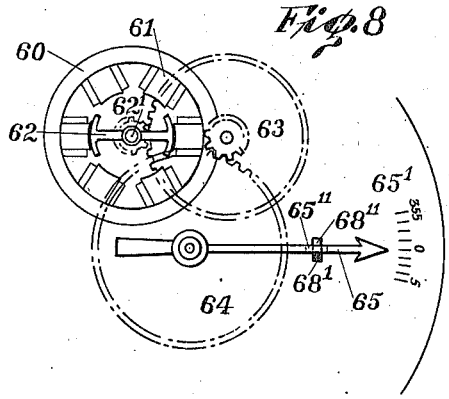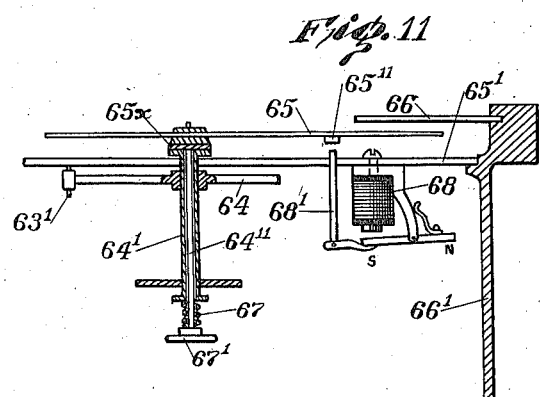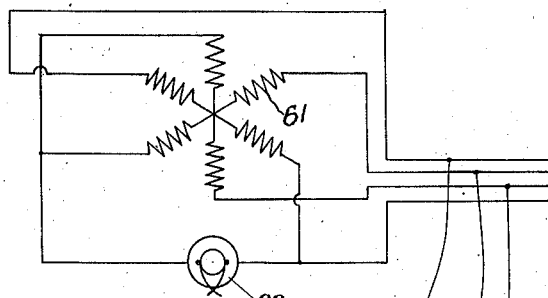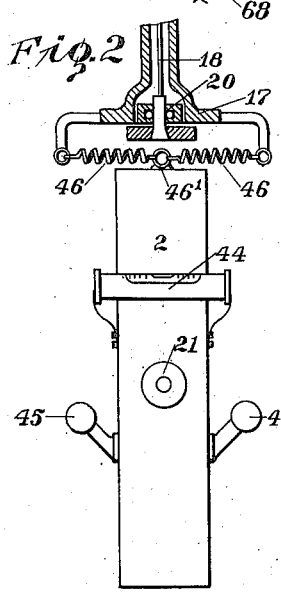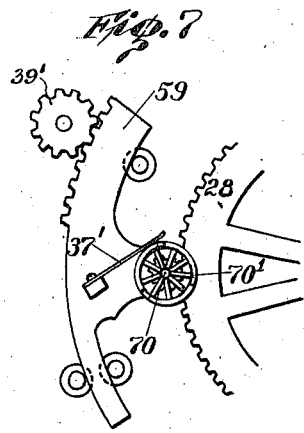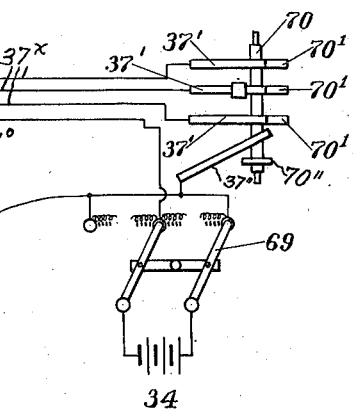

E. A. SPERRY.
GYROSCOPIC NAVIGATION APPARATUS.
APPLICATION FILED JUNE 21, 1911.
1,255,480.
Patented Feb. 5, 1918.
4 SHEETS—SHEET 3.
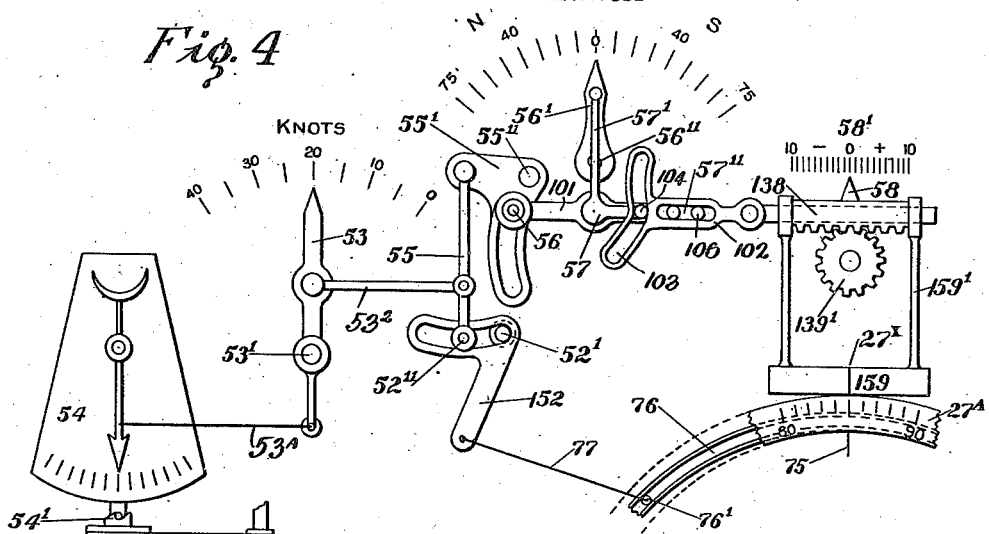
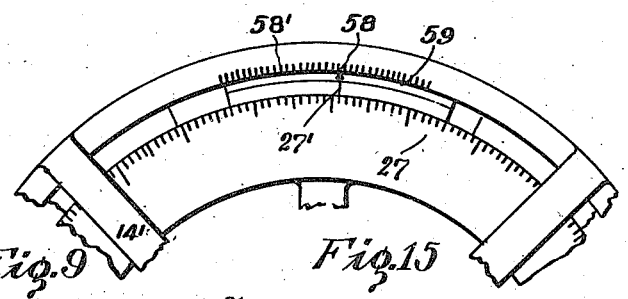
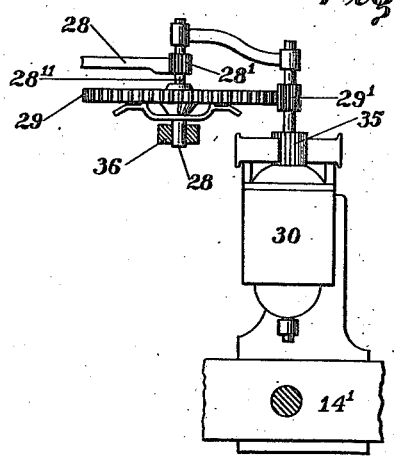
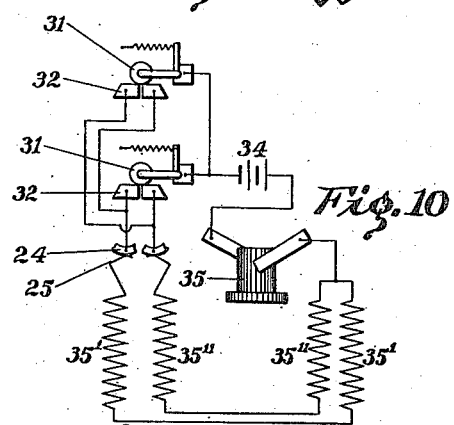
WITNESSES
INVENTOR E. A. SPERRY.
GYROSCOPIC NAVIGATION APPARATUS.
APPLICATION FILED JUNE 21, 1911.
1,255,480.
Patented Feb. 5, 1918.
4 SHEETS—SHEET 4.
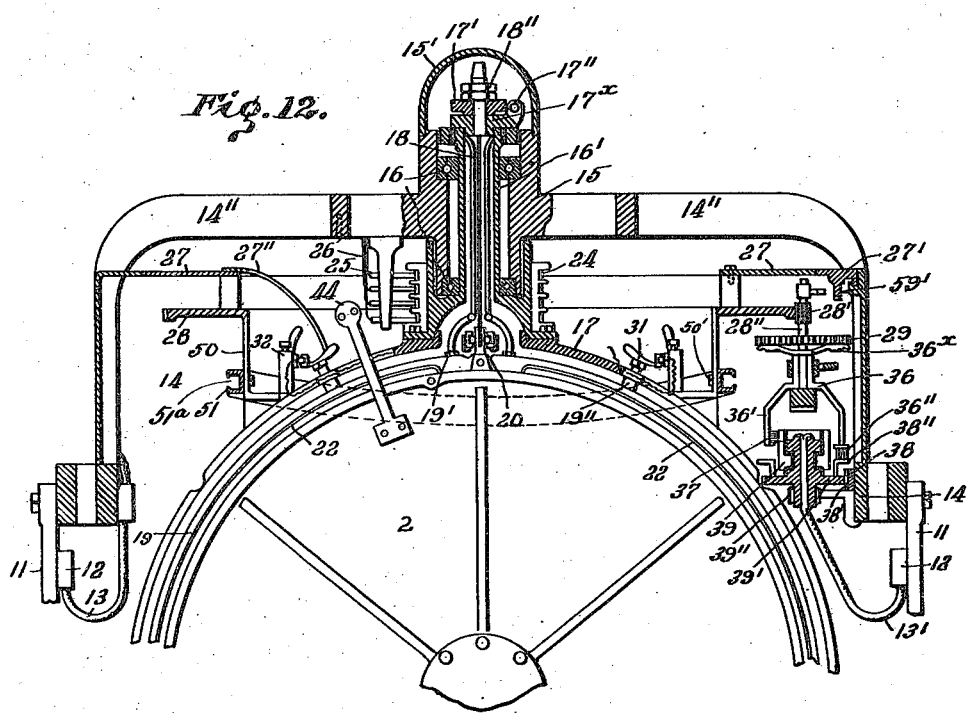
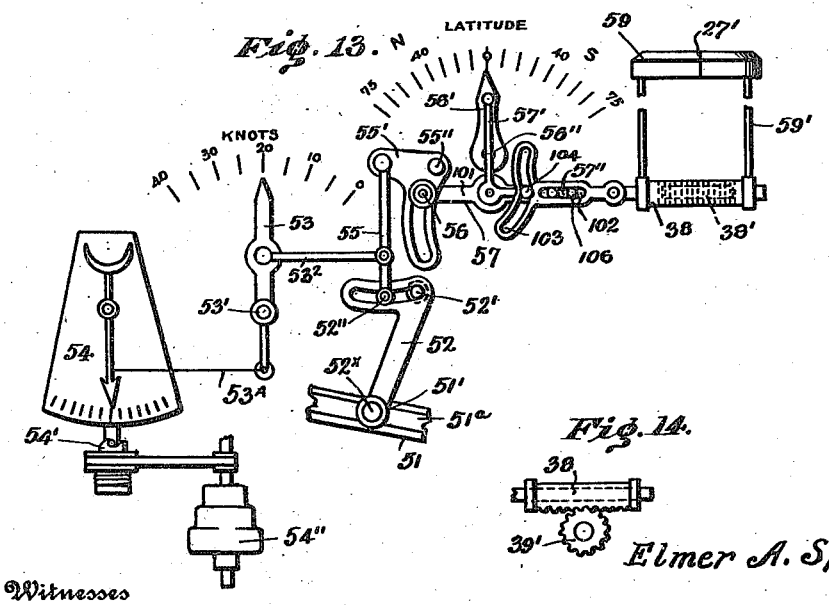
Witnesses
H. G. Robinette
H. Schoenthal
Inventor
Elmer A. Sperry
By M. C. Massie
Attorney

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

GYROSCOPIC NAVIGATION APPARATUS.

1,255,480. Specification of Letters Patent. Patented Feb. 5, 1918.

Application filed June 21, 1911. Serial No. 634,595.

*To all whom it may concern:*

Be it known that I, ELMER A. SPERRY, a citizen of the United States, residing at Brooklyn, in the county of Kings and State of New York, have invented new and useful Improvements in Gyroscopic Navigation Apparatus, of which the following is a specification.

This invention relates to gyro-navigation apparatus and has particular reference to apparatus for correcting the readings of a gyro compass used on a ship or other vehicle capable of motion, such apparatus being capable of use alone or in mechanical combination with a gyro compass, most advantageously a gyro compass of the novel type disclosed in my copending application Serial Number 634,594, of even date herewith.

In the application of gyro compasses to moving vehicles such as ships, difficulties of a serious nature are encountered owing in particular to disturbing influences being created by angular movements of the ship relatively to adjacent stationary objects and to angular movements about a diameter of the earth incidental to change of latitude. The direction which the axle of a gyro-wheel takes up is dependent upon the resultant of the various angular velocities by which it is influenced. If the gyro compass is being carried by, say, a ship, in a true east or west direction, the angular motion of the ship upon the surface of the earth takes place about the axis of rotation of the earth itself and no disturbing factor is therefore introduced. It will however be understood that if the ship is not traveling in a true east or west direction, it has an angular velocity about a diameter of the earth inclined to the axis of rotation of the earth. For example, every point on the equator moves in space, owing to the diurnal rotation of the earth, at a linear velocity of about a thousand miles per hour and with an angular velocity of one rotation per day about the axis of rotation of the earth; if a ship carrying the gyro compass could travel in a north or south direction at this same speed, a disturbing factor would be introduced equal in effect to that due to the rotation of the earth but exerting its effect in a plane perpendicular to that due to the earth's rotation. From this it is evident that the speed of a ship traveling in a north or south direction or in a direction having a northerly or southerly course component causes a disturbing influence to be exerted upon the directional force of the gyro compass. Variation in the speed of the ship introduces, of course, variation in the resultant effect of this disturbance.

The directive power of the compass is due to its rotation as a whole about the earth's axis, as is understood; hence whenever the velocity of ship has a meridional course component, the axis of the gyro-wheel is shifted through a certain angle C, say, where, $$\tan C = \frac{K \cos H}{E \cos L} = C \text{ (the angle being small)}$$

where

K = linear speed of ship in knots;
H = angle in degrees of ship's heading or course from the true geographical north; and
E cos L = easterly linear velocity of earth at latitude L, where E represents the linear velocity of a point on the equator.

Moreover, it is obvious that when a ship is traveling in any other direction than true east and west, and is therefore changing its latitude, the means employed to suppress some of the freedom of the gyro-wheel and keep its axis horizontal with respect to the surface of the earth will cause this axis to change its direction in space. Consequently even if the ship keeps a course upon a great circle, although the axis about which the earth revolves and the earth-diametrical axis about which the ship is traveling remain practically fixed in space, the axis about which the gyro-wheel itself is spinning is undergoing a change in direction in space since, as above stated, it is always being maintained horizontal relatively to the surface of the earth. From this it follows that change in latitude introduces a disturbing factor additional to that produced merely by change in the course or speed of the ship. The correction necessary to compensate for this disturbing factor is of an algebraic additive character and is proportionate to the tangent of the latitude.

From the foregoing it is evident that total correction necessary may be represented by D, where $$D = \frac{aK \cos H}{\cos L} + b \tan L.$$

where $a$ and $b$ are constants of the individual instrument.

In addition to the above mentioned three causes of disturbance of a gyro compass carried by a ship, viz: the course and the speed of the ship and change in latitude, other causes of disturbance are due to the ship getting under headway or while coming to a standstill either forward or backward since these involve change in speed of the ship; also to centrifugal forces in turning while moving in either direction; and to oscillation of the ship in cases where the gyro compass is located at a distance from the center of oscillation of the ship. The effects of these causes of disturbance may however be obviated or suppressed by means of the special type of mounting of the gyro-wheel as described fully in my other application already referred to.

According to the present invention means are provided whereby the inaccuracies introduced into the ordinary indications of the compass by the above mentioned sources of disturbance can be ascertained by mechanical means instead of by complicated mathematical computations as hitherto. These means may be employed in the form of an independent apparatus; or they may be, and most advantageously are, embodied as a part of the gyro compass equipment, so that the correction can be actually introduced into the reading device of the gyro compass so as to render the actual indications of the latter strictly accurate.

Further features of the invention relate to improvements in the transmission of the corrected indications of the gyro compass to distant receivers, or repeater compasses as they are called, and to improvements in the construction and operation of these repeater compasses.

To render the correcting means reliable, much investigation has been resorted to and one embodiment of the results is hereinafter illustrated and specified. These means constantly solve or mechanically perform the equation hereinbefore stated and when embodied as part of the gyro compass automatically introduce the net result so that the readings taken from any master gyro compass or any of the repeating compasses hold true to the meridian.

In order that the invention may be clearly understood and readily carried into effect, I will now describe the same more fully with reference to the accompanying drawings which represent partly diagrammatically and partly structurally one embodiment of my invention in which the correction device is connected to a gyro compass.

Figure 1 is a sectional elevation of the master instruments with some parts broken away or removed;

Fig. 1ª shows a plan of the pointer between the wheel and the element;

Fig. 2 shows restraining and centralizing means as between the frame and the element in elevation;

Fig. 3 is a plan view of part of the structure of Fig. 2;

Fig. 4 shows diagrammatically, one form of the automatic correction or deflection mechanism;

Fig. 5 is a detailed plan view partly in section of one pair of azimuth controlling contacts;

Fig. 6 shows a wiring diagram of the repeater system constituting an essential part of the navigation outfit;

Fig. 7 shows a detail of the transmitter and an alternative correction factor for the repeaters;

Fig. 8 is a diagrammatic plan of one form of repeating instrument;

Fig. 9 shows the azimuth motor and gearing for driving the element;

Fig. 10 shows a wiring diagram for the azimuth motor and contacts, and

Fig. 11 is an elevation, partly in section of the repeating instrument;

Fig. 12 is a showing of the upper part of a master instrument, similar to Fig. 1 but on a somewhat larger scale;

Fig. 13 is a diagrammatic view, similar to Fig. 4 of a different application of my correction mechanism, being shown as applied in this instance directly to a gyro compass. Fig. 14 is a detail thereof; Fig. 15 is a top view of a portion of the compass card.

The gyro compass itself will first be briefly described. Referring more particularly to Fig. 1, the gyro wheel is rotatably mounted in suitable journals within a closed casing 2, the journals being lubricated from oil reservoirs 6 located on opposite sides of the casing and connected by an equalizing duct 7 extending outwardly and across the periphery of the casing. Heat-dissipating ribs 2' may be provided on the casing exterior. The casing may be evacuated by withdrawing air through nozzle 8. Level 44 and handles 45 are provided to aid in adjusting the position of the casing.

The wheel casing is pivoted or supported at 21—21 in a gimbal ring 19, the ring being suspended as by torsion suspension wire 18 which is secured to a support 17' carried by a collar 17ˣ resting upon the hollow upwardly extending stem 16' of an azimuth-turning follow-up element or phantom ring 17; and the torsion suspension is adjustable vertically by means of nuts 18''. A central tubular hub 15 rotatably supports and guides hollow stem 16' as by means of ball journals at 16—16, and also carries cap 15' covering the upper end of the suspension supporting means. Brackets or arms 14'', forming part of a supporting spider 14, lead from the hub to a Cardan mounting 10, 14', said mounting being carried by standards 11—11 which support electrical terminal blocks 12 for conductor cables 13, 13'.

Elements or phantom 17 has pivotal connection to gimbal ring 19 through vertically alined anti-friction roller bearings 20—20. The phantom is also connected to the gyro wheel by yielding means such as springs 46 (Figs. 2 and 3) anchored to suitable arms extending from the phantom and to the wheel casing as at 46'. The purpose of springs 46 is to apply a compound torque on the rotor casing whenever it becomes inclined, such torque being about both the horizontal axis of pivots 21 and about the vertical axis of filament 18. For this purpose the point of connection 46' between springs 46 and the casing is slightly eccentric. A more complete discussion of these features will be found in my copending application #634594, filed June 21, 1911, for gyroscopic compasses. Electric wires 22, which carry current to drive the gyro wheel and which are preferably flexible, emerge from the interior of the case 2 and pass to ring 19, preferably at a point near pivot 21. From the ring, they are led by tubes 19' into close proximity to the base of the torsion wire 18, passing up parallel thereto and preferably free from walls of the stem 16'; then down along such walls and out to the slip rings 24, which are located between the azimuth-turning element 17 and the stationary part 14; thence by coöperating brushes 25 and wiring 26, to the cable 13, preferably near the fore and aft gudgeon standards 11 of the cardan, and terminal blocks 12, outside the Cardan ring 10. The wires passing the various pivots are preferably flexible and may form a helix as at 22'. The azimuth-moving unit is supplied with course-indicating means comprising the pointer, scale or divided compass card 27, preferably attached to the gear wheel 28 secured to the element 17. The compass card coöperates with a lubber line 27' or equivalent member carried by bracket 14''. A pinion 28' upon the spindle 28'' meshes with the gear wheel 28. Upon spindle 28'' is also secured gear 29; and meshing therewith is the pinion 29' of the azimuth motor 30 (see Fig. 9), serving to turn the element 17 responsively to the relative motions between the gyro wheel and the element 17.

This actuation of the element 17 is accomplished in part by coöperating electrical contacts in the power circuit supplying the azimuth motor and preferably present at least in duplicate, the members of each set being relatively movable. In the present instance, each set may comprise a wheel or trolley 31, and a double poled contact 32, (Fig. 1). The plural sets are preferably in parallel or in multiple arc circuit as shown in diagram in Fig. 10, thus securing reliability of operation and rendering inspection, replacement or renewal convenient and practicable. Handles 31' and 32' Fig. 5 are provided on the respective contact members, and a dovetail slot 33 on the double poled contact and pins 31'' on the trolley, (Fig. 5), serve to secure the contacts in place and also to render them quickly removable and individually adjustable for presenting fresh wearing surfaces.

34, (Fig. 10) represents a source of electrical supply; and 35, the commutator of the motor 30. Field coils 35' and 35'' are connected respectively to the two segments or poles of the contact 32. These contact segments coöperate with the contact 31 which preferably is spring pressed and which is connected to the electrical source 34. It will be observed that by the arrangement of insultation between the contacts 32, the roller 31 may move on to either one of the contacts and therefore energize either one of the fields 35' or 35''; and since these are wound in opposite directions, the motor will be caused to start and run in one direction or the other depending upon which field coil is energized. Gear wheel 20 is thus turned, and with it the element 17, upon the bearings or journals 16 within the tubular hub 15.

Referring to Fig. 1, it will be seen that the trolley contacts are mounted on pins 19'', rising from the gimbal ring 19, or equivalent part, partaking of all azimuth movements of the gyro wheel or its journal frame or casing. This movement being relative to the element, it will thus be seen that the azimuth movements of the ring impelled by the motor 30, are brought about or caused by the relative movements between the wheel and the element.

In order to indicate the relative movements of such parts, a pointer 27'' (see Fig. 1ª) may be attached to one of the pins 19'' so as to read upon a suitable indication on the card 27.

I will now describe typical means which I adopt to ascertain the value of the necessary main compass reading corrections referred to earlier in the specification or to actually introduce the same into the main compass movements, and to transmit them to the repeater compasses.

Fig. 4 shows, partly in diagram, the mechanism for properly introducing all the various components into a net correction which may then be used to either add (if positive), or subtract (if negative) from the reading of the compass card 27. This mechanism may be portable and independent of the main gyro compass and simply used to ascertain the correction for its indications as shown in Fig. 4, or it may be embodied as part of the gyro compass as shown in Fig. 13, which is the preferred form. The resultant movement from the several pieces of mechanism employed to perform the several component corrections is imparted to a bar 38 marked 138 in Fig. 4, hereinafter sometimes termed, for convenience, a correction device, a correction member or a device for indicating compass corrections. The speed correction varies as a direct function of the speed, as indicated in the formula, and is brought about by means of a pointer 53, which is pivoted at 53' and coöperates with a scale of speeds (knots). This pointer may either be adjusted by hand, after the speed has been ascertained in any known manner, or may be automatically adjusted by being connected as by 53$^a$ to the pointer of a tachometer 54 driven, preferably in one direction only as indicated by the ratchet 54', from the ship's engine or turbine 54''.

The course correction varies as a trigonometrical function (the cosine) of the meridional component of the course or heading, as indicated in the formula, and is performed or introduced by means of a bent lever 52 (Fig. 13) having an integral boss 52$^x$, or the like, pivotally supported at 52', said lever being suitably connected to and controlled by a movable indicator of course or heading. If the correction mechanism as a whole is to be used independently of the main gyro compass, the bent lever (152, Fig. 4) may be connected to an arm 77 having a pin or cam roller 76' working in grooved ring 76 which is mounted to move with a dummy compass card 27$^A$ and is arranged slightly eccentric thereto, as shown in Fig. 4, whereby movement of card 27$^A$ about its center causes arm 152 to swing about pivot 52' on account of the eccentricity of the ring 76.

If, on the other hand, the correction mechanism is to be combined with and automatically actuated by the gyro compass itself, a ring 51 (Fig. 12) provided with a groove 51$^a$ may be secured by suitable fastening means 50' to flange 50 depending from gear wheel 28. Since the gear wheel carries compass card 27, the grooved ring therefore moves in azimuth with said compass card. The ring is tilted relative to the compass card, and in the groove 51$^a$ works a cam follower, such as roller 51', carried by the bent lever 52, before described. Apparent azimuth movements of the compass card 27 therefore give an upward or downward movement to cam follower 51', movement proportional to a function of the ship's course or heading being thereby transmitted to bent lever 52 and thence to the correction mechanism more fully illustrated in Fig. 13. In any case, whether the bent lever be connected to the gyro compass or to a dummy compass card, it will be understood that movements of the compass card incidental to variations in the course of the ship causes angular movements of the bent lever 52 or 152 about its pivot. These movements are passed on by the link 55 to the bent lever 55'. In order that the speed correction may be superimposed upon the course correction, a point on the speed pointer 53 is connected by link 53$^2$ to a point on the link 55 as seen clearly in Fig. 4. The lower end of this link 55 is slidably pinned at 52'' in a curved slot in the bent lever 52. The parts are so arranged that when the ring 51 is situated for an east and west course the slot in the lever 52 is concentric with the link 55 as a radius. Obviously this is as it should be, since for a true east and west course the speed of the ship introduces no disturbing influence. For any other course, however, the altered position of the lever 52 causes the proper amount of movement to be imparted to the link 55 in proportion to the speed. Obviously however, at zero ship-speed any change of course would be immaterial; this corresponds to the pin 52'' taking up a position immediately over the pivot 52' when the pointer 53 is set at zero.

The latitude correction is also a trigonometrical function (the cosine) of the latitude, as indicated by the formula, and is performed or introduced by the pointer 56' pivoted at 56'' and coöperating with a latitude scale graduated according to cosines of latitude. The latitude correction is impressed upon the other two corrections before they reach the bar 38 by means of the link 57, which connects the bent lever 55' with the said bar. The bent lever 55' is pivoted at 55'' and is actuated by the link 55 as already described; it is also formed with a curved slot in which works slidably a pin 56 on one end of the link 57. The link 57 is connected to the pointer 56' by means of the link 57'. It will be understood that when the pointer 56' is adjusted for some latitude, the link 57' moves the link 57 about the end remote from the pin 56 and causes this pin to move in the slot of the lever 55'. Hence the combined course and speed corrections transmitted to the bar 38 by the link 57 have superimposed on them the latitude cosine correction.

In order to introduce the plus or minus tangent of latitude correction, the link 57 is formed in two relatively slidable parts 101 and 102 the latter being formed with the transverse curved slot 103 and a longitudinal slot 57'' while the former is formed with a plurality of pins 106 engaging in said slot so as to hold the two parts in alinement and at the same time permit longitudinal adjustment; also the link 57' is formed with a bent arm having a pin 104 on it engaging in the said slot 103. In this way any latitude adjustment of the pointer 56' causes a lengthening or shortening of the compound link 57, and the shape of the slot 103 is such that this lengthening or shortening introduces a correcting movement proportional to the tangent of the north or south latitude respectively.

From the foregoing it is evident that all the various corrections corresponding to different factors of travel of the ship or other vehicle are combined into one movement, which is impressed on the bar or correction device 38. This bar is furnished with a pointer 58 coöperating with a scale 58' so that the total correction to be applied to the main compass reading can be ascertained merely by inspection, no calculations or reference to tables being necessary.

In cases where it is desired that the net correction to apply to the main compass reading should not merely be ascertained mechanically as by reading the scale and pointer 58, 58', but should actually be impressed upon either the main or dummy compass reading, the bar 38 may be provided with legs 59' or 159' (shown in full in Figs. 4 and 13 but broken away in Fig. 1) to carry a plate indicated in Fig. 13 by the reference numeral 59 and in Fig. 4 by 159. The plate 59 bears a lubber's line 27' on which the compass card 27 is read. The general structure of these parts is more clearly shown in the modification shown in Fig. 4.

In Fig. 4 the compass car is of annular shape, and a line 75 on a part stationary with respect to the ship structure serves as a zero. The plain readings of the compass card scale can then be read by means of the zero 75 and the card scale, while the true position of the meridian is automatically indicated at all headings by the position of the movable lubbers line 27$^x$ relative to the said compass card scale.

In order that the corrected main compass readings may be transmitted to the one or more distant repeater compasses the bar 38 may be formed with a rack 38' as shown in Figs. 12, 13 and 14 the teeth of which mesh with the gear wheel 39' forming part of a commutator hereinafter described for transmitting the movements of the motor 30 that drives the element 17 to the respective repeater compasses.

I will now describe the means I have illustrated for enabling the indications of the main compass to be transmitted and reproduced in distant instruments. It will be remembered that the motor 30 drives the element 17 through the gear wheels 29', 29, 28' and 28. Of these wheels, the gear wheel 29 is employed to also set into operation the means whereby repeater compasses are actuated to move in synchronism with the element 17. For this purpose the spindle 28'' of the gear wheel 29 is encircled by a sleeve 36 driven from the wheel 29 by means of the spring arms 36$^x$ and having brush arms 36' carrying brushes 36'' and 37, the former (36'') bearing upon the horizontal surface of a plain ring 38'', and the latter (37) upon commutator segments 39. The body of the commutator carrying the segments 39 and ring 38'' is hollow to provide for the cable connections 13' being passed through it from the segments to the repeater instruments and is rotatably carried in an insulated bearing 39'' upon a base attached to the Cardan ring 14'. The said commutator body is also formed with the concentric gear wheel 39' hereinbefore referred to as gearing with the teeth of the rack 38' of the bar 38 belonging to the correction mechanism.

Owing to this construction, the movement of brushes 36'' and 37, relative to the ring and commutator, is a resultant of the movement of the compass card or movable indicating part 27 combined with the movement of the bar 38 of the correction device; and such relative movement serves to actuate the repeater compass or compasses to a corresponding extent. The transmitting mechanism just described is therefore controlled by the combined movements of the movable indicating part on the master compass and of the correction device.

Figs. 3 and 11 illustrate one constructional form of the repeater instruments, or compasses as they may be termed, and Fig. 6 is a wiring diagram for the same. Each repeater compass embodies a motor 60, the six field poles of which are wound with coils 61, which are operated to attract an armature 62, which turns upon the central pivot 62', driving, by means of a pinion, the gear wheel 63, which in turn operates the gear wheel 64, and drives any form of arc indicator, such as the pointer 65, which moves with the gear wheel 64, and coöperates with the stationary scale 65'; or, as is usual, the scale may move, coöperating with the stationary pointer. The whole may be covered, as by glass 66, and be located within the casing 66'. In Fig. 11, the stem of the gear 63 is indicated by 63'. A pinion on this stem meshes with the gear 64, the hollow stem 64' of which receives the central pin 64'', and serves to support the pointer 65 through the friction engagement at 65$^x$, seen at the upper surface of the flange of the hollow stem 64'. These friction surfaces are kept in engagement by the spring 67. A handle or equivalent device 67' is provided in any suitable locality, as at the lower end of the stem 64'', for operating the pointer at will or manually setting or adjusting. A magnet, preferably polarized, is indicated at 68, and when energized in the proper direction, as by a reversing switch 69 (Fig. 6), serves to elevate a pin 68', so that its top engages either one side or the other of a stop 65" on the pointer 65. This works in an elongated slot 68" (Fig. 8), so that its engagement upon either side of the projection 65" of the pointer 65 will cause the same to exactly center with reference to the scale. If the scale is the moving element, the stop 65" will, of course, be fastened thereto.

In the wiring diagram of Fig. 6 the form of commutator above described for effecting automatic control of the current to the coils 61 of the repeater compass is shown at 39, the brush being indicated at 37. In addition thereto I have shown a modified form of commutator at 70, which is also illustrated in Fig. 7. In this construction the gear wheel 28 that carries the card of the main compass is shown in gear with a pinion on a spindle 70 on which is also secured a wheel composed of three segmental contacts 70'. The leads 37ˣ from the coils 61 would be in electrical connection with the three brushes bearing on contacts 70' and the return lead 37° in electrical connection with a source of electrical supply, such as battery 34, which in turn is connected to brush 37" bearing on the common or return contact 70; but for greater clearness of illustration in Fig. 6 the contacts 70' and 70" are shown as spaced apart on the spindle 70 with a brush in contact with each of them. In any case it will be understood that the azimuth movements of the gear wheel 28 causes the repeater compass to be automatically actuated. The movements imparted to the repeater compass are corrected for disturbances in the construction shown in Fig. 7 owing to the brush 37' and the commutator being carried by the member 59 to which the correcting movements derived from the correction mechanism of Fig. 4 are imparted by way of the gear wheel 39'. It will of course be understood that when the member 59 is moved by the gear wheel 39' the commutator pinion rolls on the gear wheel 28 which moves with the compass card. The resultant rotation of the commutator pinion, due to the combined movements of member 59 and the gear wheel 28, therefore causes the commutator to be actuated to an extent necessary to correct the impulses transmitted to the repeater compass.

The circumferential lengths of the segmental contacts 70' of the commutator shown in Fig. 7 are such, or the lap of the brush 37' in connection with the commutator segments 39 of the commutator shown in Fig. 1 is such, that the repeater compass operates in a peculiar manner, viz: A pair of opposite poles is energized and then the next pair of poles is also energized before the first pair is cut off, and then the first pair is cut off leaving the second pair alone energized. The third pair is then energized, but only after the second pair has remained energized alone during a predetermined interval. By virtue of successive poles being of opposite polarity, and by virtue of the above described control of the electric currents, the armature 62 is made to take up twelve distinct and positive positions instead of six, all operated by means of three circuits.

The magnet 68 (Fig. 11) will be seen to be energized in any suitable circuit, such as the return circuit of the magnet coils 61 of the motor 60 (Fig. 6). In the position in which the switch 69 is shown in Fig. 6, the magnet 68 when energized repels its armature N S as shown in Fig. 11, and this is the normal operative position of the parts. When, however, the switch 69 is thrown over into its alternative position, the current passing from the coils 61 of the motor 60 traverses the magnet 68 in the reverse direction and the south pole of the armature N S is attracted, thereby bringing the pin 68' into position for engaging with the stop 65" and thus arresting the movement of the pointer 65. This portion of the invention, being of general application to electrical indicators, is described more in detail and claimed in my copending applications #859329, filed August 31, 1914 for multiple turret indicators, which to this extent is a continuation of the present case, and #46819 filed June 28, 1914 for gyro-compass repeating system.

The practical application and utility of the automatic correction indicator deflecting means is too apparent to require special mention. The laws which the instrument is made to follow have been carefully pointed out, and one embodiment of mechanism showing how these results may be accomplished has been described, whether independent, or as forming a part of the complete equipment. The location of the correction means between the element initiating the directional function and the scales used for reading or interpreting the results, whether they be located upon the master instrument or upon repeating or translating instruments, is important and has also been detailed, and the importance and utility of its intermediate location is apparent.

The reversal of the alternate circuits upon the multipolar repeating instrument serves a useful purpose in establishing the integrity of the intermediate positions and virtually doubling the number of definite positions taken up by the armature.

While it is designed to use the various features and elements in the combinations and relations described, some of these may be altered and others omitted without interfering with the more general results outlined, and the invention extends to such use.

What I claim is:

1. Navigation apparatus comprising the combination with a suitable gyro-wheel and means, including a movable part, controlled thereby and capable of indicating course or heading, of a device capable of indicating compass corrections, and means for transmitting motion proportional to a component of course or heading from said movable part to such correction device to give correction indications.

2. Navigation apparatus comprising the combination with a suitable gyroscope and means, including a movable part, controlled thereby capable of indicating course or heading, of a device capable of indicating compass corrections, means for transmitting motion proportional to a component of course or heading from said movable part to such correction device to give correction indications, and means for automatically applying such correction indications to the compass readings.

3. Navigation apparatus comprising the combination with a gyro compass provided with an azimuth movable element, of mechanism for mechanically computing compass corrections, comprising means whereby said mechanism is actuated by said element, means for automatically applying such corrections to the compass readings, and means for indicating the sign and amount of such corrections.

4. In gyro navigation apparatus, the combination with a gyro wheel of an indicator including a movable part controlled by the gyro wheel and capable of indicating the apparent arc-in-azimuth movements of the gyro wheel, a correction device having a movable part and coöperating with the indicator, an electric transmitter driven from the combined motion of the movable indicator part and the movable part of the correcting device for transmitting corrected indications, and a repeating device having an indicator operated by such transmitter.

5. In gyro navigation apparatus, the combination with the gyro wheel, a member arranged to move in response to the apparent arc-in-azimuth movements of the wheel, means capable of indicating such movements, and a correction device including a moving part coöperating with such indicating means, of a power motor for actuating the aforesaid member, an electrical transmitter driven from the combined motion of said member and the said moving part of the correcting device, and a repeating device having indicating means operated by such transmitter.

6. Navigation apparatus for use on a ship or other vehicle capable of motion comprising, in combination, a movable course indicator, means for rendering the indicator capable of indicating course, a cam member arranged to be moved by said indicator, a device capable of indicating compass corrections, and means engaging said cam for transmitting motion to said device.

7. Navigation apparatus for correcting gyro compass readings comprising the combination, with a gyro compass provided with a movable compass card, of a cam member arranged to move with said card, a pivoted lever having one arm connected to said cam member, a second pivoted lever, a link adjustably connecting an arm of the second lever with an arm of the first lever, means for adjusting the position of such connecting link in accordance with speed indications and thereby modifying the motion transmitted to the second lever, a movable correction member, a link adjustably connecting an arm of the second lever with said correction member, and means for adjusting the position of the last named connecting link in accordance with latitude indications and thereby modifying the motion transmitted to said correction member.

8. Navigation apparatus for correcting gyro compass readings comprising the combination with a gyro compass having a movable compass card carried thereby, of a cam member arranged to move with said card, a system of levers connected to said cam member and arranged to transmit motion therefrom, means movable in proportion to indications of another factor of travel of the ship or other vehicle on which the compass is mounted, such movable means being connected to such lever system and capable of modifying the motion transmitted thereby, and a movable correction member arranged to be actuated by such lever system.

9. Navigation apparatus comprising the combination, with a gyroscope and a course indicator controlled thereby, of means for correcting the apparent readings of the course indicator, and means for transmitting motion from said gyroscope to such correcting means.

10. Navigation apparatus comprising the combination with a gyro compass having a cam member controlled by the gyroscope thereof, of a device for correcting the apparent readings of said compass, and means engaging said cam member and arranged to transmit motion therefrom to such correcting device.

11. Navigation apparatus comprising the combination with a gyroscope and a compass card controlled thereby, of a cam ring tilted at an angle to said card and arranged to move therewith in azimuth, a cam follower engaging said cam ring, a device for indicating compass corrections, and means connected to said cam follower for actuating the correction-indicating device.

12. Navigation apparatus for use on a ship or other vehicle comprising the combination, with a gyro compass having a movable course indicator, of means controlled by the gyro-compass for altering the apparent indications of said movable indicator to correct for errors incident to changes of heading of such ship or other vehicle.

13. Navigation apparatus for use on a ship or other vehicle comprising the combination, with a gyro compass having a movable course indicator, of means associated with said indicator for correcting the apparent indications thereof in accordance with changes of latitude of such ship or other vehicle.

14. Navigation apparatus for use on a ship or other vehicle comprising the combination, with a gyro compass having a movable indicator of compound means associated with said indicator for correcting the apparent indications thereof in accordance with changes both in speed and latitude of such ship or other vehicle.

15. Navigation apparatus comprising the combination, with a gyro compass having a movable indicating part, of movable means capable of correcting the apparent indications of said part, a repeating instrument and mechanism controlled by the combined movements of said part and such correcting means for transmitting corrected compass readings to said repeating instrument.

16. Navigation apparatus comprising the combination, with a gyro compass comprising a movable indicator, of a movable member provided with a lubber's line, and means controlled by the movements of said indicator and arranged to move said member and thereby to correct the apparent indications of the compass.

17. Navigation apparatus comprising the combination, with a compass having a movable indicating part, of mechanism capable of correcting the apparent indications thereof, and means whereby said mechanism is controlled by said movable indicating part.

18. Navigation apparatus comprising the combination, with a gyro wheel and a movable course indicator controlled thereby, of a correction member capable of correcting the apparent readings of said course indicator, means for transmitting motion from said gyro wheel to said member, and means for modifying the motion thus transmitted in proportion to a factor of travel other than course.

19. Navigation apparatus comprising the combination with a gyro compass having a course indicator movable in azimuth, of a cam mounted to move with said indicator, a correction device coöperating with said indicator and transmission means connecting said cam with said correction device.

20. Navigation apparatus comprising the combination with a gyro compass having a course indicator movable in azimuth, of a cam ring mounted to move with said indicator and tilted with respect thereto, a movable member provided with a lubber's line coöperating with said indicator, and means comprising a cam follower for transmitting motion from said cam ring to said movable member.

21. Navigation apparatus comprising the combination, with a gyro wheel and a movable course indicator controlled thereby, of a correction member capable of correcting the apparent readings of said course indicator, means movable in proportion to latitude indications, and mechanism controlled by said gyro wheel for transmitting to said correction member a resultant of the movements of said course indicator and said means.

22. Navigation apparatus comprising the combination, with a gyro wheel and a movable course indicator controlled thereby, of a correction member capable of correcting the apparent readings of said course indicator, separate members movable in proportion to latitude and speed, respectively, and means controlled by said gyro wheel for transmitting to said correction member a resultant of the movements of said course indicator and of said separate members.

23. Navigation apparatus comprising the combination, with a suitable gyro wheel and indicating means controlled thereby, of a member movable in azimuth and controlled by the gyro wheel, a device capable of indicating compass corrections, and means for transmitting motion proportional to a component of course or heading from said member to such correction device to give correction indications.

24. Navigation apparatus comprising the combination, with a suitable gyro wheel and indicating means controlled thereby, of a member controlled by the gyro wheel, a device capable of indicating compass corrections, means for transmitting motion proportional to a component of course or heading from said member to such correction device to give correction indications, and means for automatically applying such correction indications to the compass readings.

25. Navigation apparatus comprising the combination, with a compass, of means automatically controlled by said compass for computing corrections to the compass readings.

26. Navigation apparatus comprising the combination, with a gyro compass, of means automatically controlled by said compass for computing corrections to the compass readings, and means for applying such corrections to the apparent readings of the compass to obtain net corrected readings.

27. Navigation apparatus comprising the combination, with a gyroscope and an azimuth movable element controlled thereby, of a cam ring tilted at an angle to said element and arranged to move therewith in azimuth, a device for indicating compass corrections, and means for transmitting motion from said cam ring to the correction-indicating device to actuate the latter.

28. Navigation apparatus comprising the combination, with a gyro compass, of a track or guide way carried by said compass, a device for correcting the apparent readings of the compass, and mechanism actuated by said track, as the compass turns for operating such correcting device.

29. In gyro navigation apparatus, the combination with a gyro wheel, of a part associated therewith, means whereby said part is caused to partake of the apparent arc in azimuth movements of said wheel, a movable correction device positioned adjacent said part, an electric transmitter, means whereby the same is driven from the combined motions of said part and said device for transmitting corrected indications, a repeating device having indicating means and connections whereby the same is operated by such transmitter.

30. In gyro navigation apparatus, the combination with a gyro wheel, of a part associated therewith, means whereby said part is caused to partake of the apparent arc in azimuth movements of said wheel, a movable correction device positioned adjacent said part, an electric transmitter mounted on said device, means whereby the same is connected with said part so as to be actuated by relative movement between said part and said device, a repeating device having indicating means and connections whereby the same is operated by such transmitter.

31. In gyro navigational apparatus, the combination with a gyro wheel, and means for supporting the same for spinning about a substantially horizontal axis and for turning about a vertical axis, of a follow-up element mounted adjacent thereto for rotation about a vertical axis, reversing contacts mounted on said means and element, a reversible motor in circuit with said contacts, means for rotating said element from said motor, a movable correction device, an electric transmitter mounted on said device, means whereby the same is connected with said element so as to be actuated by relative movement between said element and said device, a repeating instrument having indicating means, and connections whereby the same is operated by said transmitter.

32. In gyro navigational apparatus, the combination with a gyro wheel, and means for supporting the same for spinning about a substantially horizontal axis and for turning about a vertical axis, of a follow-up element mounted adjacent thereto for rotation about a vertical axis, reversing contacts mounted on said means and element, a reversible motor in circuit with said contacts, means for rotating said element from said motor, a movable correction device, an electric transmitter, means whereby the same is driven by the combined motions of said element and said device, a repeating instrument having indicating means, and connections whereby the same is operated by said transmitter.

33. In gyro navigational apparatus, the combination with a gyro wheel, and means for supporting the same for spinning about a substantially horizontal axis and for turning about a vertical axis, of a follow-up element mounted adjacent thereto for rotation about a vertical axis, reversing contacts mounted on said means and element, a reversible motor in circuit with said contacts, means for rotating said element from said motor, a movable correction device, an electric transmitter, means whereby the same is driven by the combined motions of said motor and said device, a repeating instrument having indicating means, and connections whereby the same is operated by said transmitter.

In testimony whereof I have hereunto set my hand in presence of two subscribing witnesses.

ELMER A. SPERRY.

Witnesses:
HANNIBEL C. FORD,
CHARLES H. CONNER.

Certificate of Correction.

It is hereby certified that in Letters Patent No. 1,255,480, granted February 5, 1918, upon the application of Elmer A. Sperry, of Brooklyn, New York, for an improvement in "Gyroscopic Navigation Apparatus," an error appears in the printed specification requiring correction as follows: Page 9, after line 96 insert the following as claim 34:

*34. Navigational apparatus comprising the combination with a compass having a rotatable indicating element and a movable reference member, of means for correcting the apparent indications of said element including means for transmitting from said element to said member an adjustment proportional to a component of the apparent course or heading indicated by said compass.;* and that the said Letters Patent should be read with this correction therein that the same may conform to the record of the case in the Patent Office.

Signed and sealed this 16th day of October, A. D., 1923.

[SEAL.]

WM. A. KINNAN,
*Acting Commissioner of Patents.*